(12) United States Patent
Bauchot et al.

(10) Patent No.: US 8,355,993 B2
(45) Date of Patent: *Jan. 15, 2013

(54) AUTHENTICATION OF AN END USER

(75) Inventors: Frederic Bauchot, Saint-Jeannet (FR); Flemming Boegelund, Frederikssund (DK); Gerard Marmigere, Drap (FR); Sebastian Thomschke, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,250

(22) Filed: Apr. 24, 2012

(65) Prior Publication Data

US 2012/0204230 A1    Aug. 9, 2012

Related U.S. Application Data

(63) Continuation of application No. 12/316,149, filed on Dec. 10, 2008.

(30) Foreign Application Priority Data

Nov. 28, 2008    (EP) .................................... 08305865

(51) Int. Cl.
*G06Q 20/00*    (2012.01)
(52) U.S. Cl. ................. 705/64; 705/67; 705/16; 705/39; 726/28
(58) Field of Classification Search ........................ 705/64
See application file for complete search history.

(56) References Cited

U.S. PATENT DOCUMENTS

| 4,016,404 | A | 4/1977 | Appleton |
| 4,670,644 | A | 6/1987 | Grayson |
| 5,056,142 | A | 10/1991 | Lapointe et al. |
| 5,251,259 | A | 10/1993 | Mosley |
| 5,450,491 | A | 9/1995 | McNair |
| 5,488,664 | A | 1/1996 | Shamir |
| 5,742,035 | A | 4/1998 | Kohut |

(Continued)

FOREIGN PATENT DOCUMENTS

JP    10307799    11/1998

(Continued)

OTHER PUBLICATIONS

Notice of Allowance (Mail Date Jul. 19, 2012) for U.S. Appl. No. 13/454,198, filed Apr. 24, 2012; Confirmation No. 8952.

(Continued)

*Primary Examiner* — Jacob C. Coppola
(74) *Attorney, Agent, or Firm* — Schmeiser, Olsen & Watts; John Pivnichny

(57) ABSTRACT

A method and system for authenticating an end user. A first pattern of colored quadrilaterals is generated. A second pattern of multiple colored nodes that include a first subset of nodes is generated. The first and second patterns are sent to the end user. If a transparent credit card is overlaid by the end user on top of the second pattern, then a second subset of nodes in the credit card would match in color and location the first subset of nodes. The authenticity status of the end user is determined by determining whether each node of a third subset of nodes within the second subset of nodes (i) corresponds to a unique node of the multiple colored nodes and (ii) has a color that matches a specific color in one quadrilateral of the colored quadrilaterals. The determined authenticity status is sent to the end user via an output device.

20 Claims, 4 Drawing Sheets
(2 of 4 Drawing Sheet(s) Filed in Color)

U.S. PATENT DOCUMENTS

| | | | |
|---|---|---|---|
| 5,939,699 | A | 8/1999 | Perttunen et al. |
| 7,007,168 | B2 | 2/2006 | Kubo et al. |
| 7,181,433 | B2 | 2/2007 | Yousofi |
| 7,263,205 | B2 | 8/2007 | Lev |
| 7,266,693 | B1 | 9/2007 | Potter et al. |
| 7,659,869 | B1 | 2/2010 | Bauchot et al. |
| 7,672,906 | B2 | 3/2010 | Schwartz et al. |
| 8,150,034 | B2 | 4/2012 | Hogl |
| 8,201,227 | B2 | 6/2012 | Bauchot et al. |
| 8,260,717 | B2 | 9/2012 | Bauchot et al. |
| 8,260,718 | B2 | 9/2012 | Bauchot et al. |
| 2001/0026248 | A1 | 10/2001 | Goren et al. |
| 2005/0140497 | A1 | 6/2005 | Chiviendacz et al. |
| 2005/0144449 | A1 | 6/2005 | Voice |
| 2005/0144450 | A1 | 6/2005 | Voice |
| 2005/0149761 | A1 | 7/2005 | Chiviendacz et al. |
| 2006/0015725 | A1 | 1/2006 | Voice et al. |
| 2006/0020559 | A1 | 1/2006 | Steinmetz |
| 2006/0031174 | A1 | 2/2006 | Steinmetz |
| 2006/0156385 | A1 | 7/2006 | Chiviendacz et al. |
| 2007/0005967 | A1 | 1/2007 | Mister et al. |
| 2007/0098965 | A1 | 5/2007 | Hoshiyama |
| 2007/0277224 | A1 | 11/2007 | Osborn et al. |
| 2007/0289000 | A1 | 12/2007 | Weiss |
| 2008/0005035 | A1 | 1/2008 | Schwartz et al. |
| 2008/0148352 | A1 | 6/2008 | Matsumoto et al. |
| 2009/0067627 | A1 | 3/2009 | Hogl |
| 2009/0282464 | A1 | 11/2009 | Bauchot et al. |
| 2010/0024004 | A1 | 1/2010 | Boegelund et al. |
| 2010/0138657 | A1 | 6/2010 | Bauchot et al. |
| 2010/0138912 | A1 | 6/2010 | Bauchot et al. |
| 2012/0204229 | A1 | 8/2012 | Bauchot et al. |
| 2012/0204230 | A1 | 8/2012 | Bauchot et al. |

FOREIGN PATENT DOCUMENTS

| | | |
|---|---|---|
| JP | 2000172644 | 6/2000 |
| JP | 2003256373 | 9/2003 |
| WO | 2007068098 | 6/2007 |

OTHER PUBLICATIONS

U.S. Appl. No. 13/494,077, filed Jun. 15, 2012; First Named Inventor: Frederic Bauchot; Confirmation No. 6274.
Verheul et al.; Binding Cryptography. A Fraud-Detectible Alternative to Key-Escrow Proposals; The Computer Law & Security Report, Jan.-Feb. 1997; 17 pages.
U.S. Appl. No. 13/451,952, filed Apr. 20, 2012; Confirmation No. 6274.
U.S. Appl. No. 13/454,198, filed Apr. 24, 2012; Confirmation No. 8952.
Ito et al., "Authentication with 3D Pattern Communication," Electronics and Communications in Japan, Part 1, vol. 87, No. 12, 2004. Obtained from Wiley Periodicals, Inc., pp. 78-89.
QRick Card System, [online] 1 page. [retrieved on May 28, 2008]. Retrieved from the Internet:< URL: http://ubiks.net/local/blog/jmt/archives3/004419.html>.
Help in Connecting to Jyske Netbank. [online] 2 pages—original and English Translation. [retrieved on Sep. 11, 2008]. Retrieved from the Internet:< URL: https://www.jyskedistance.dk/service/_jb/ASP/Apps/NetbankDemo/denno/jb/html/DK/hlplogon1.htm>.
RSA SecurID. [online] 3 pages. [retrieved on Aug. 21, 2008]. Retrieved from the Internet:< URL: http://www.rsa.com/node.aspx?id=1156>.
Zhao, et al.; Anti-Phishing Mutual Authentication Using Visual Secret Sharing Scheme, Oct. 17-20, 2010, Information Theory and its Applications (ISITA), 2010 International Symposium, pp. 560-565.
SecurID, Wikipedia, Nov. 27, 2007. [online]. 2 pages. [retrieved on Dec. 1, 2007]. Retrieved from the Internet: < URL: http://en.wikipedia.org/wiki/SecurID >.
Office Action (Mail Date Jun. 7, 2011) for U.S. Appl. No. 12/128,060, filed May 28, 2008, Confirmation No. 9627.
Notice of Allowance (Mail Date Feb. 8, 2012) for U.S. Appl. No. 12/128,060, filed May 28, 2008, Confirmation No. 9627.
Notice of Allowance (Mail Date Sep. 28, 2009) for U.S. Appl. No. 12/329,972, filed Dec. 8, 2008, Confirmation No. 9926.
Office Action (Mail Date Oct. 24, 2011) for U.S. Appl. No. 12/316,149, filed Dec. 10, 2008, Confirmation No. 9012.
Notice of Allowance (Mail Date Feb. 10, 2012) for U.S. Appl. No. 12/316,149, filed Dec. 10, 2008, Confirmation No. 9012.
Office Action (Mail Date Oct. 20, 2011) for U.S. Appl. No. 12/316,221, filed Dec. 10, 2008, Confirmation No. 1248.
Office Action (Mail Date Jan. 28, 2011) for U.S. Appl. No. 11/967,910, filed Dec. 31, 2007, Confirmation No. 7834.
Office Action (Mail Date Jun. 14, 2011) for U.S. Appl. No. 11/967,910, filed Dec. 31, 2007, Confirmation No. 7834.
Amendment filed Jan. 20, 2012 in response to Office Action (Mail Date Oct. 20, 2011) for U.S. Appl. No. 12/316,221, filed Dec. 10, 2008, Confirmation No. 1248.
Notice of Allowance (Mail Date Mar. 26, 2012) for U.S. Appl. No. 12/316,221, filed Dec. 10, 2008, Confirmation No. 1248.
Amendment filed Sep. 6, 2011 in response to Office Action (Mail Date Jun. 7, 2011) for U.S. Appl. No. 12/128,060, filed May 28, 2008, Confirmation No. 9627.
Final Office Action (Mail Date Nov. 17, 2011) for U.S. Appl. No. 12/128,060, filed May 28, 2008, Confirmation No. 9627.
Amendment after Final filed Jan. 17, 2012 in response to Final Office Action (Mail Date Nov. 17, 2011) for U.S. Appl. No. 12/128,060, filed May 28, 2008, Confirmation No. 9627.
Amendment filed Jan. 23, 2012 in response to Office Action (Mail Date Oct. 24, 2011) for U.S. Appl. No. 12/316,149, filed Dec. 10, 2008, Confirmation No. 9012.
Amendment filed Apr. 20, 2011 in response to Office Action (Mail Date Jan. 28, 2011) for U.S. Appl. No. 11/967,910, filed Dec. 31, 2007, Confirmation No. 7834.
Request for Continued Examination and Amendment filed Sep. 14, 2011 in response to Office Action (Mail Date Jun. 14, 2011) for U.S. Appl. No. 11/967,910, filed Dec. 31, 2007, Confirmation No. 7834.
U.S. Appl. No. 13/454,198, filed Apr. 24, 2012; First Named Inventor: Frederic Bauchot; Confirmation No. 8952.
Request for Continued Examined filed Sep. 7, 2012 for U.S. Appl. No. 13/454,198, filed Apr. 24, 2012; Confirmation No. 8952.
Preliminary Amendment filed Aug. 9, 2012 for U.S. Appl. No. 13/494,077, filed Jun. 6, 2012, Confirmation No. 6274.

AUTHENTICATION OF AN END USER

This application is a continuation application claiming priority to Ser. No. 12/316,149, filed Dec. 10, 2008.

BACKGROUND OF THE INVENTION

The present invention relates to authenticating an end user; more specifically, authenticating an end user by means of dynamic information to prevent fraud.

Conventional authentication methods utilize static information to validate an end user. Since static information by its very nature rarely changes, individuals can easily capture an end user's authentication information for fraudulent use in the future.

Furthermore, conventional authentication methods traditionally employ only 1-way authentication. The term 1-way authentication hereinafter means identifying only a single party to a multiple party transaction. Conventional authentication methods usually call for an end user to authenticate to an entity (e.g. bank, credit card company, government agency, etc.) without the entity authenticating to the end user. The use of 1-way authentication methods exposes an end user to phishing attacks. The term phishing hereinafter means an attempt to criminally and/or fraudulently acquire sensitive information by masquerading as a trustworthy entity in an electronic medium.

SUMMARY OF THE INVENTION

The present invention provides a method for authenticating an end user, said method comprising:

generating a first pattern in response to receiving an authentication request from said end user, said first pattern comprising a plurality of randomly colored quadrilaterals wherein one quadrilateral of said plurality of quadrilaterals is associated with said end user;

generating a second pattern in response to receiving confirmation that said end user received said first pattern, said second pattern comprising a plurality of colored nodes, said plurality of colored nodes containing a first subset of nodes matching both color and location to a second subset of nodes residing in a transparent credit card being controlled by said end user;

determining an authenticity status of said end user by comparing a third subset of nodes received from said end user with said first subset of nodes, said third subset of nodes being received in response to sending said second pattern to said end user, said end user having generated said third subset of nodes by overlaying said transparent credit card on top of said second pattern and selecting at least one node which displays a color not being black; and sending said determined authenticity status to said end user via an output device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE DRAWINGS

Definitions

The term 'credit card' as used herein refers to any automated teller machine (ATM) card, credit card, charge card, debit card, gift card, etc. issued by an entity which allows an end user the ability to purchase goods and/or services therewith.

The term 'node' as used herein refers to a single point residing within either a login field and/or a transparent credit card.

Specification

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
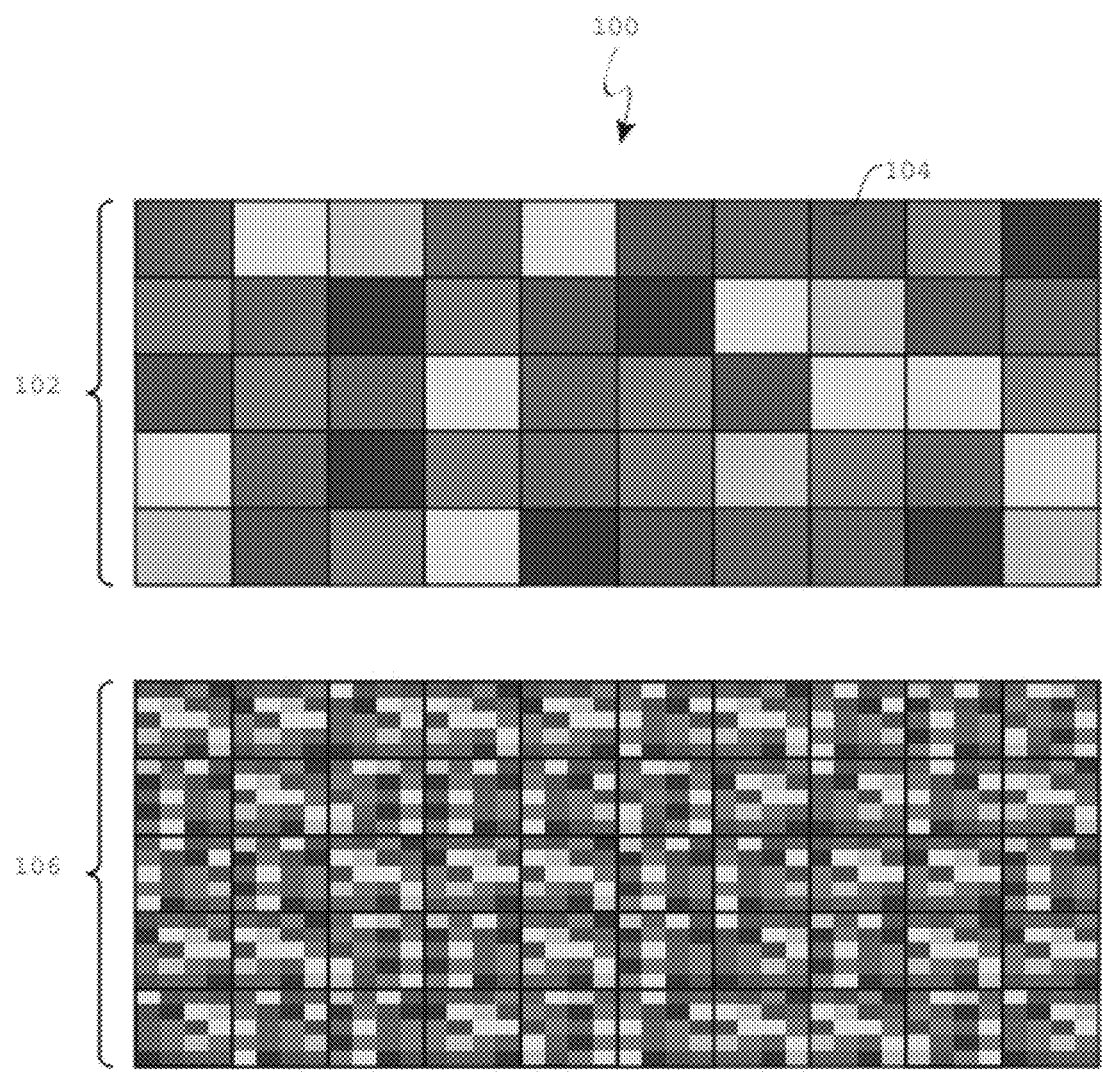
FIG. 1 illustrates a graphical representation of a login field used to authenticate an end user, in accordance with embodiments of the present invention.

FIG. 1 illustrates a graphical representation of a login field 100 used to authenticate an end user, in accordance with embodiments of the present invention.

Example 100 comprises the two patterns 102 and 106 which the login field 100 displays to an end user during an authentication attempt. When the end user requests and authentication attempt, the login field 100 first displays pattern 102.

Pattern 102 comprises a plurality of quadrilaterals each displaying a randomly selected color. Residing within the plurality of quadrilaterals exists a secret quadrilateral 104 known only to an end user and the provider of the login field 100. The secret quadrilateral 104 displays a color, randomly selected, which the end user must remember in order to properly authenticate. Specifically, the end user will utilize the color identified in the secret quadrilateral along with a transparent credit card and the second pattern 106 to complete an authentication request.

Pattern 106 comprises a plurality of nodes each displaying a seemingly random color. Note multiple nodes make up the space previously designated for a single quadrilateral with respect to pattern 102. The nodes appear to comprise randomly selected colors, but the color pattern is actually unique to the end user attempting to authenticate. Specifically, a subset of the nodes displayed in the second pattern 106 match the color and location of a subset of nodes residing in the end user's transparent credit card. The end user to attempt authentication will use these matching nodes.

Figure 2:
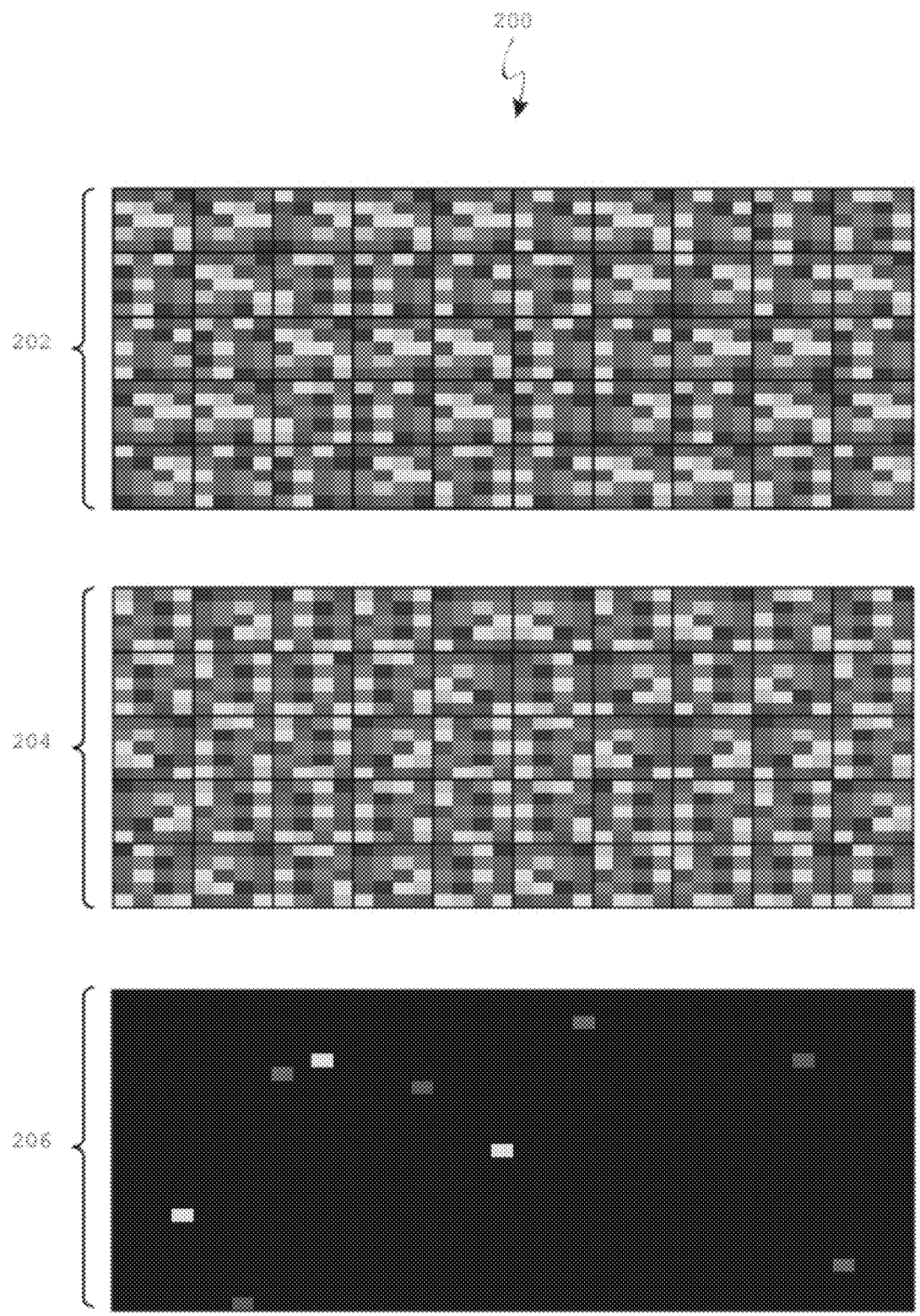
FIG. 2 illustrates a graphical representation of the combination of transparent credit card and login field, in accordance with embodiments of the present invention.

FIG. 2 illustrates a graphical representation of the combination 200 of transparent credit card 202 and login field 204, in accordance with embodiments of the present invention.

The transparent credit card 202 is assigned to an end user prior to an authentication attempt. The transparent credit card comprises 202 a plurality of nodes, each displaying a seemingly random color. Only the provider of said transparent credit card 202 knows the pattern of colors contained in the transparent credit card 202.

The login field 204 also comprises a plurality of nodes, each displaying a seemingly random color. The color pattern of nodes contained within the login field 204 is dynamically created each time the end user whishes to authenticate, therefore each authentication attempt will produce a different color pattern of nodes in the login field 204.

As noted supra, a subset of nodes within the login field 204 match the color and location of a subset of nodes residing in the transparent credit card 202. The login field 204 in FIG. 2 is displaying its second pattern (see 106 in FIG. 1, supra), therefore it is assumed the first pattern (see 102 in FIG. 1, supra) was previously displayed to the end user. It is also assumed the end user identified the secret quadrilateral 104 with respect to the login field's 204 first pattern 102 and memorized the color displayed therein.

Overlaying the transparent credit card 202 on top of the login field 204 results in a third pattern 206. The third pattern 206 displays the nodes in both the transparent credit card 202 and the login field 204 displaying the same color and having the same location.

In one embodiment of the present invention, the login field 204 will display colors such that when the transparent credit card 202 is overlaid, if the overlaid nodes do not match in color they will therein produce a dark, i.e. black, color. The blackening of non-color matching nodes will help identify for the end user which nodes are to be selected from to effectuate the authentication attempt.

In another embodiment of the present invention, the transparent credit card 202 when overlaid on top of the login field 204 merely turns non-color matching nodes a neutral color so as to highlight the matching colored nodes more easily.

The third pattern 206 comprises at least three different groups of differently colored nodes. Specifically and with respect to FIG. 2, the third pattern 206 contains a group of red, green, and yellow nodes. At this point an end user would select the group of nodes which match the color displayed in the secret quadrilateral 104 with respect to FIG. 1, supra.

If the end user properly selects the red nodes displayed in the third pattern 206, since red was the color of the secret quadrilateral 104 in FIG. 1, the end user would properly authenticate and gain access to secure information. However, if the end user selects the wrong color (i.e. green or yellow nodes), the end user is denied access to the secure information.

Figure 3:
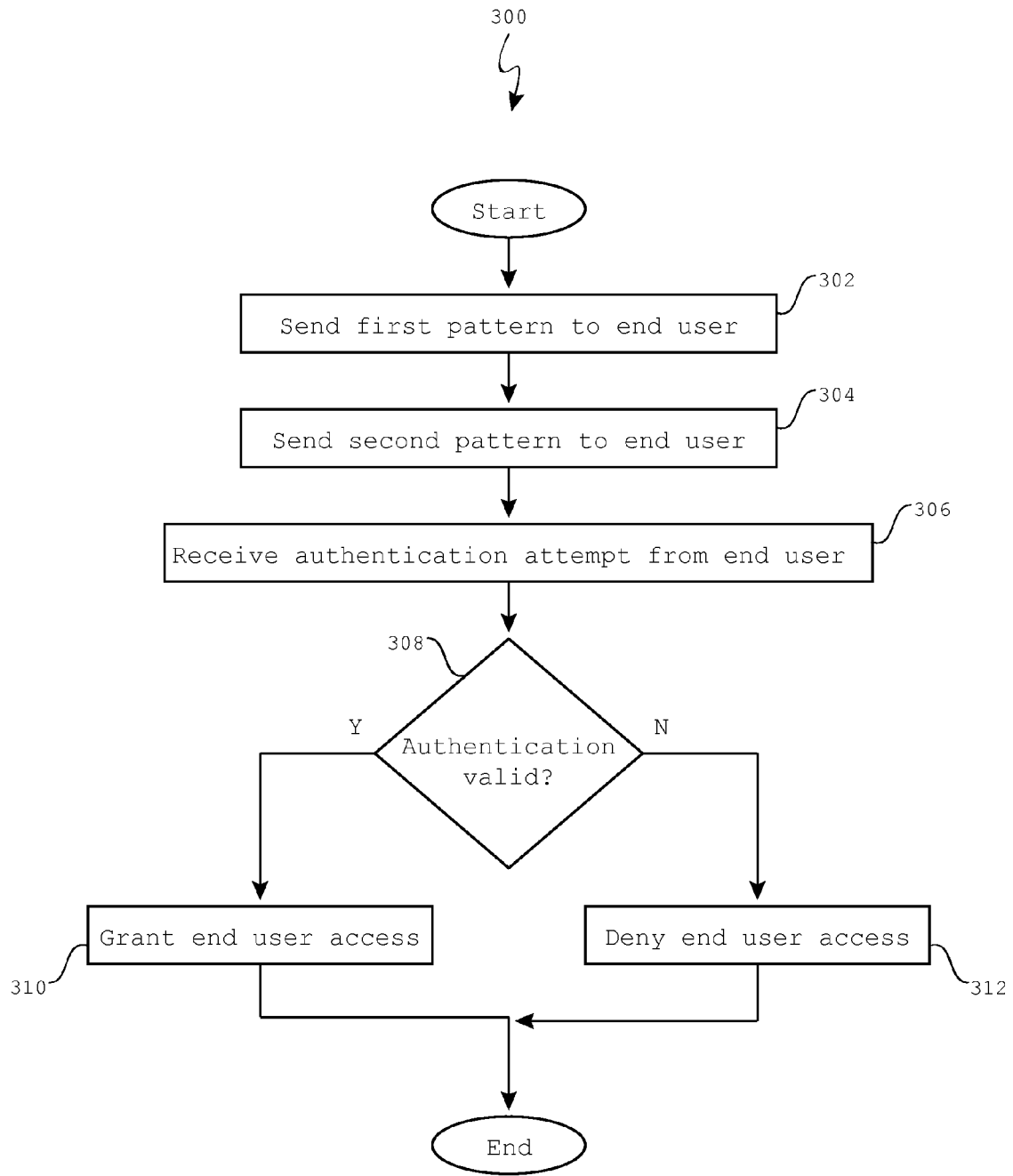
FIG. 3 illustrates a method for authenticating an end user, in accordance with embodiments of the present invention.

FIG. 3 illustrates a method 300 for authenticating an end user, in accordance with embodiments of the present invention.

The method 300 begins with step 302 which comprises sending a first pattern to the end user. The first pattern is sent to the end user in response to the end user requesting access to the secure information.

In one embodiment of the present invention, the end user requests the authentication attempt by submitting a unique userID. The userID is therein used to identify the color pattern residing in the transparent credit card assigned to the end user as well as the secret quadrilateral known only to the end user.

Figure 4:
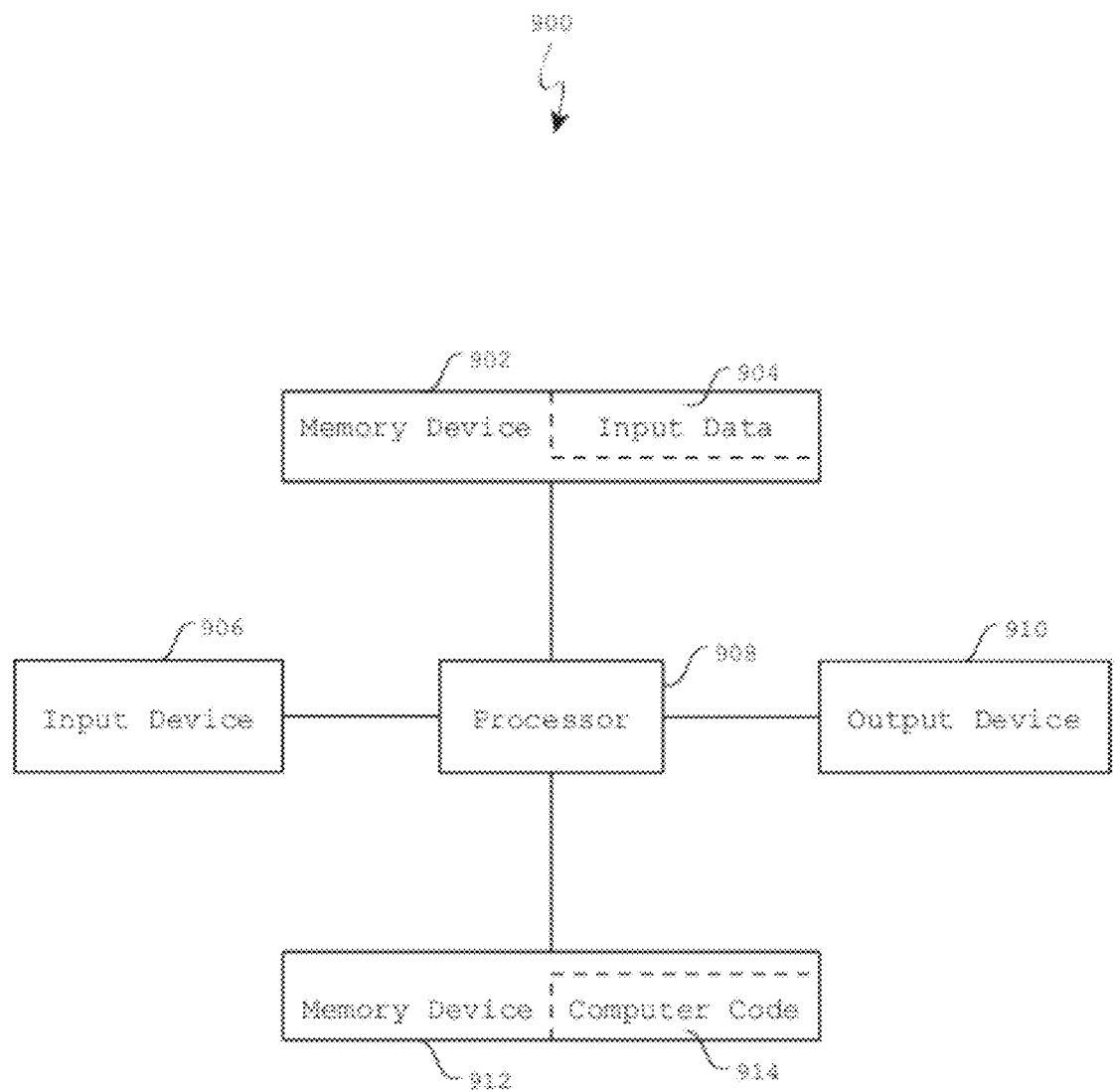
FIG. 4 illustrates a computer system which may facilitate a method for authenticating and end user, in accordance with embodiments of the present invention.

Step 302 generates the first pattern consisting of a plurality of quadrilaterals each having a randomly selected color and sends said first pattern to the end user by means of an output device 910 (see FIG. 4, infra). Step 302 also notes which color was displayed in the secret quadrilateral which is known only to the end user.

After completion of step 302, the method 300 continues with step 304 which comprises sending a second pattern to the end user. The second pattern is sent to the end user in response to the end user identifying that they have received and studied the first pattern.

In one embodiment of the present invention, the end user identifies that they received and studied the first pattern by sending, inter alia, an acknowledgement signal, a character string known only to the end user, an input signal, etc. In response to receiving an acknowledgement signal, step 304 sends the second pattern to the end user by means of an output device 910 (see FIG. 4, infra).

The second pattern comprises a plurality of nodes, each displaying a seemingly random color. Again, a subset of nodes within the second pattern match the color and location of a subset of nodes residing in the transparent credit card 202 belonging to the end user attempting to authenticate.

Contained within the subset of nodes in the second pattern are nodes of at least three different color and at least three nodes per color. Specifically, one of the colors present in the subset of nodes matches the color displayed in the secret quadrilateral pursuant to step 302.

After completion of step 304, the method 300 continues with step 306 which comprises receiving authentication data from the end user. Step 306 receives data comprising the locations for a set of nodes which the end user selected after overlaying their transparent credit card on top of the second pattern.

After completion of step 306, the method 300 continues with step 308 which comprises determining whether the end user's authentication attempt is valid or invalid. Step 308 compares the nodes selected in the authentication data received pursuant to step 306 with the subset of nodes residing in the second pattern.

If the authentication data contains all nodes which: 1) correspond to nodes in the subset of nodes residing in the second pattern; and 2) correspond to the color identified in the secret quadrilateral with respect to the first pattern, then step 308 returns a response 'yes' and the method 300 continues with step 310 which comprises granting the end user access to the secure information.

In one embodiment of the present invention, step 308 returns a response 'no' and the method 300 denies the end user access 312 if the authentication data received pursuant to step 306 contains at least one node having a color which does not correspond to the color identified in the secret quadrilateral with respect to the first pattern. For example, if the authentication data contains three red node locations and one green node location where the subset of nodes in the second pattern comprises three red nodes and the secret quadrilateral displayed the color red, the end user's authentication attempt fails.

In an alternative embodiment of the present invention, step 308 returns a response 'no' and the method 300 denies the end user access 312 if the authentication data received pursuant to step 306 contains at least one node not corresponding to any node in the subset of nodes residing in the second pattern. For example, if the authentication data contains a node not present in the subset of nodes in the second pattern, the end user's authentication attempt fails.

In another alternative embodiment of the present invention, step 308 returns a response 'no' and the method 300 denies the end user access 312 if the authentication data received pursuant to step 306 does not contain all nodes which: 1) correspond to nodes in the subset of nodes residing in the second pattern; and 2) correspond to the color identified in the secret quadrilateral with respect to the first pattern. For example, if the authentication data contains only two red node locations where the subset of nodes in the second pattern comprises three red nodes and the secret quadrilateral displayed the color red, the end user's authentication attempt fails.

Step 310 comprises granting the end user access to secure information. After completion of step 310, the method 300 ends.

Step 312 comprises denying the end user who attempted to authenticate access to the secure information. In one embodiment of the present invention, after completion of step 312, the method 300 ends. In an alternative embodiment of the present invention, after completion of step 312, the method 300 returns to step 302 and sends a new first pattern to the end user to attempt an authentication again.

FIG. 4 illustrates a computer system 900 which may facilitate a method for authenticating and end user, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for authenticating and end user according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for authenticating and end user. Thus, the present invention discloses a process for supporting computer infrastructure, comprising integrating, hosting, maintaining and deploying computer-readable code into a computing system (e.g., computing system 900), wherein the code in combination with the computing system is capable of performing a method for authenticating and end user.

In another embodiment, the invention provides a business method that performs the process steps of the invention on a subscription, advertising and/or fee basis. That is, a service provider, such as a Solution Integrator, can offer to create, maintain, support, etc. a process for authenticating an end user. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 900 as a particular configuration of hardware and software, any configuration of hardware and software, as would be known to a person of ordinary skill in the art, may be utilized for the purposes stated supra in conjunction with the particular computer system 900 of FIG. 4. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for authenticating an end user, said method comprising:

generating, by a processor of the computer system, a first pattern comprising a plurality of colored quadrilaterals;

said processor generating a second pattern comprising a first plurality of colored nodes, said first plurality of colored nodes containing a first subset of nodes;

said processor sending the first pattern and the second pattern to the end user;

after said sending the first pattern and the second pattern to the end user, said processor receiving a location and color of each node of a third subset of nodes from the end user;

said processor determining whether the end user is authentic by determining whether required conditions are satisfied, wherein the first and second patterns are configured such that if a transparent credit card were overlaid by the end user on top of the login field then a second subset of nodes of a second plurality of colored nodes residing in the transparent credit card would match in color and location the first subset of nodes, wherein the third subset of nodes is a subset of the second subset of nodes residing in the transparent credit card, and wherein the required conditions are that each node in the third subset of nodes (i) corresponds to a unique node of the first subset of nodes and (ii) has a color that matches a specific color in one quadrilateral of the plurality of colored quadrilaterals, wherein the one quadrilateral represents a secret of said end user that is shared with the computer system; and after said determining whether the end user is authentic, said processor sending to the end user via an output device a communication of whether the end user is authentic.

2. The method of claim 1, said method comprising:

determining that the end user is authentic by determining that the required conditions are satisfied.

3. The method of claim 2, said method comprising:

said processor receiving an authentication request from the end user, wherein said generating the first pattern is in response to said receiving the authentication request; and in response to said determining that the end user is authentic, said processor approving the authentication request from the end user.

4. The method of claim 1, said method comprising:
determining that the end user is not authentic by determining that the required conditions are not satisfied.

5. The method of claim 4, said method comprising:
said processor receiving an authentication request from the end user, wherein said generating the first pattern is in response to said receiving the authentication request; and in response to that said determining that the end user is not authentic, said processor denying said authentication request from the end user.

6. The method of claim 1, wherein the method comprises generating a login field that comprises the second pattern.

7. The method of claim 6, wherein if the transparent credit card were overlaid by the end user on top of the login field, then each node of the second plurality of nodes not in the second subset of nodes is displayed in a resulting color of black.

8. The method of claim 1, wherein the colored quadrilaterals in the plurality of colored quadrilaterals are randomly colored.

9. The method of claim 1, wherein the one quadrilateral is associated with the user.

10. The method of claim 1, wherein the first subset of nodes and the second subset of nodes each contain no less than nine nodes and the nine nodes collectively display no less than three different colors.

11. A computer program product, comprising a computer-usable storage device having computer-readable program code stored therein, said computer-readable program code configured to be executed by a processor of a computer system implement a method for authenticating an end user, said method comprising:
said processor generating a first pattern comprising a plurality of colored quadrilaterals;
said processor generating a second pattern comprising a first plurality of colored nodes, said first plurality of colored nodes containing a first subset of nodes;
said processor sending the first pattern and the second pattern to the end user;
after said sending the first pattern and the second pattern to the end user, said processor receiving a location and color of each node of a third subset of nodes from the end user;
said processor determining whether the end user is authentic by determining whether required conditions are satisfied, wherein the first and second patterns are configured such that if a transparent credit card were overlaid by the end user on top of the login field then a second subset of nodes of a second plurality of colored nodes residing in the transparent credit card would match in color and location the first subset of nodes, wherein the third subset of nodes is a subset of the second subset of nodes residing in the transparent credit card, and wherein the required conditions are that each node in the third subset of nodes (i) corresponds to a unique node of the first subset of nodes and (ii) has a color that matches a specific color in one quadrilateral of the plurality of colored quadrilaterals, wherein the one quadrilateral represents a secret of said end user that is shared with the computer system; and
after said determining whether the end user is authentic, said processor sending to the end user via an output device a communication of whether the end user is authentic.

12. The computer program product of claim 11, said method comprising:
determining that the end user is authentic by determining that the required conditions are satisfied.

13. The computer program product of claim 12, said method comprising:
said processor receiving an authentication request from the end user, wherein said generating the first pattern is in response to said receiving the authentication request; and in response to said determining that the end user is authentic, said processor approving the authentication request from the end user.

14. The computer program product of claim 11, said method comprising:
determining that the end user is not authentic by determining that the required conditions are not satisfied.

15. The computer program product of claim 14, said method comprising:
said processor receiving an authentication request from the end user, wherein said generating the first pattern is in response to said receiving the authentication request; and in response to that said determining that the end user is not authentic, said processor denying said authentication request from the end user.

16. A computer system comprising a processor, a memory coupled to the processor, and a computer readable storage device coupled to the processor, said storage device containing program code configured to be executed by the processor via the memory to implement a method for authenticating an end user, said method comprising:
said processor generating a first pattern comprising a plurality of colored quadrilaterals;
said processor generating a second pattern comprising a first plurality of colored nodes, said first plurality of colored nodes containing a first subset of nodes;
said processor sending the first pattern and the second pattern to the end user;
after said sending the first pattern and the second pattern to the end user, said processor receiving a location and color of each node of a third subset of nodes from the end user;
said processor determining whether the end user is authentic by determining whether required conditions are satisfied, wherein the first and second patterns are configured such that if a transparent credit card were overlaid by the end user on top of the login field then a second subset of nodes of a second plurality of colored nodes residing in the transparent credit card would match in color and location the first subset of nodes, wherein the third subset of nodes is a subset of the second subset of nodes residing in the transparent credit card, and wherein the required conditions are that each node in the third subset of nodes (i) corresponds to a unique node of the first subset of nodes and (ii) has a color that matches a specific color in one quadrilateral of the plurality of quadrilaterals; and
after said determining whether the end user is authentic, said processor sending to the end user via an output device a communication of whether the end user is authentic.

17. The computer system of claim 16, said method comprising:
  determining that the end user is authentic by determining that the required conditions are satisfied.

18. The computer system of claim 16, said method comprising:
  said processor receiving an authentication request from the end user, wherein said generating the first pattern is in response to said receiving the authentication request; and
  in response to said determining that the end user is authentic, said processor approving the authentication request from the end user.

19. The computer system of claim 1, said method comprising:
  determining that the end user is not authentic by determining that the required conditions are not satisfied.

20. The computer system of claim 19, said method comprising:
  said processor receiving an authentication request from the end user, wherein said generating the first pattern is in response to said receiving the authentication request; and
  in response to that said determining that the end user is not authentic, said processor denying said authentication request from the end user.

* * * * *